(12) United States Patent
Katiyar

(10) Patent No.: US 8,629,374 B2
(45) Date of Patent: Jan. 14, 2014

(54) MODIFIED FLUX SYSTEM IN CORED ELECTRODE

(75) Inventor: Rajeev Katiyar, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2176 days.

(21) Appl. No.: 11/099,267

(22) Filed: Apr. 5, 2005

(65) Prior Publication Data

US 2006/0219684 A1    Oct. 5, 2006

(51) Int. Cl.
B23K 35/02    (2006.01)

(52) U.S. Cl.
USPC ............ 219/145.22; 219/146.31; 219/146.23; 219/146.32

(58) Field of Classification Search
USPC .............. 219/145.22, 146.31, 146.23, 146.32
See application file for complete search history.

(56) References Cited

U.S. PATENT DOCUMENTS

| | | | |
|---|---|---|---|
| 1,888,453 A | | 11/1932 | De Pape |
| 2,720,473 A | * | 10/1955 | Donahey ................. 148/26 |
| 3,848,109 A | * | 11/1974 | Zvanut .................. 219/146.41 |
| 3,947,655 A | | 3/1976 | Gonzalez et al. |
| 4,045,593 A | * | 8/1977 | Hill et al. ................. 427/59 |
| 4,131,784 A | | 12/1978 | Kimura et al. |
| 4,355,224 A | | 10/1982 | Mesick et al. |
| 5,003,155 A | | 3/1991 | Chai et al. |
| 5,055,655 A | | 10/1991 | Chai et al. |
| 5,120,931 A | | 6/1992 | Kotecki et al. |
| 5,225,661 A | | 7/1993 | Chai et al. |
| 5,369,244 A | | 11/1994 | Kulikowski |
| 5,438,083 A | * | 8/1995 | Takimoto et al. ........... 523/401 |
| 6,339,209 B1 | | 1/2002 | Kotecki |
| 2003/0094444 A1 | * | 5/2003 | Kato et al. ............ 219/145.22 |
| 2004/0187961 A1 | | 9/2004 | Crockett |

FOREIGN PATENT DOCUMENTS

EP    0067494    12/1982
EP    1537940    6/2005

OTHER PUBLICATIONS

XP 001028478.
XP 002390155.

* cited by examiner

Primary Examiner — Alexandra Elve
(74) Attorney, Agent, or Firm — Hahn Loeser & Parks LLP

(57) ABSTRACT

A cored electrode having reduced moisture pick-up properties and which forms a weld bead with low diffusible hydrogen in a gas shielded electric arc welding process. The cored electrode includes a metal sheath and a fill composition. The fill composition includes titanium dioxide, slag forming agent and a sodium-silica-titanate compound.

36 Claims, No Drawings

MODIFIED FLUX SYSTEM IN CORED ELECTRODE

The invention relates generally to the field of welding and more particularly directed to electrodes having improved weld bead formation properties, and even more particularly directed to cored electrodes having reduced moisture pick-up properties and which form weld beads having reduced amounts of diffusible hydrogen.

BACKGROUND OF THE INVENTION

In the field of arc welding, the main types of welding processes are gas-metal arc welding with solid (GMAW) or metal-cored wires (GMAW-C), gas shielded flux-cored arc welding (FCAW-G), self shielded flux-cored arc welding (FCAW-S), shielded metal arc welding (SMAW) and submerged arc welding (SAW). Of these processes, gas metal arc welding with solid or metal-cored electrodes are increasingly being used for joining or overlaying metallic components. These types of welding processes are becoming increasingly popular because such processes provide increased productivity and versatility. Such increase in productivity and versatility results from the continuous nature of the welding electrodes in gas metal arc welding (GMAW & GMAW-C) which offers substantial productivity gains over shielded metal arc welding (SMAW). Moreover, these electrodes produce very good looking welds with very little slag, thus saving time and expense associated with cleaning welds and disposing of slag, a problem that is often encountered in the other welding processes.

In gas metal arc welding with solid or cored electrodes, a shielding gas is used to provide protection for the weld against atmospheric contamination during welding. Solid electrodes are appropriately alloyed with ingredients that, in combination with the shielding gas, provide porosity free welds with the desired physical and mechanical properties. In cored electrodes, these ingredients are on the inside, in the core (fill) of a metallic outer sheath, and provide a similar function as in the case of solid electrodes.

Solid and cored electrodes are designed to provide, under appropriate gas shielding, a solid, substantially porosity free weld with yield strength, tensile strength, ductility and impact strength to perform satisfactorily in the final applications. These electrodes are also designed to minimize the quantity of slag generated during welding. Cored electrodes are used increasingly as an alternative to solid wires because of increased productivity during welding fabrication of structural components. Cored electrodes are composite electrodes consisting of a core (fill) material surrounded by a metallic outer sheath. The core consists mainly of metal powder and fluxing ingredients to help with arc stability, weld wetting and appearance etc., such that the desired physical and mechanical properties are obtained in the weld. Cored electrodes are manufactured by mixing up the ingredients of the core material and depositing them inside a formed strip, and then closing and drawing the strip to the final diameter. Cored electrodes provide increased deposition rates and produce a wider, more consistent weld penetration profile compared to solid electrodes. Moreover, they provide improved arc action, generate less fume and spatter, and provide weld deposits with better wetting compared to solid electrodes.

In the art of welding, much prior effort has been expended in developing flux compositions of the type having predetermined flux components intended to perform in predetermined manners. A large number of compositions have been developed for use as fluxes in arc welding. Fluxes are utilized in arc welding to control the arc stability, modify the weld metal composition, and provide protection from atmospheric contamination. Arc stability is commonly controlled by modifying the composition of the flux. It is therefore desirable to have substances which function well as plasma charge carriers in the flux mixture. Fluxes also modify the weld metal composition by rendering impurities in the metal more easily fusible and providing substances with which these impurities may combine, in preference to the metal to form slag. Other materials may be added to lower the slag melting point, to improve slag fluidity, and to serve as binders for the flux particles.

Cored electrodes are commonly used in electric arc welding of steel base metals. These electrodes generally yield high strength welds in a single pass and multiple passes at high welding speeds. These electrodes are formulated to provide a solid, substantially nonporous weld bead with tensile strength, ductility and impact strength to meet the desired end use of various applications.

One of the many challenges during the formation of a weld metal is to reduce the amount of diffusible hydrogen in the weld bead. Diffusible hydrogen is a known cause of cracking in weld beads. Many studies have shown that an increased amount of moisture content in the flux system results in an increased amount of diffusible hydrogen in the weld metal. Hydrogen in the weld metal can result in hydrogen inducing cracking and eventual detrimental failure of the weld. Sodium and potassium silicate are commonly used as arc stabilizers and sometimes used in binder systems for flux components. Potassium silicate is known for it's high moisture pick-up tendencies.

In view of the present state of the art of the fill compositions used in conjunction with cored welding electrodes, there is a need for a welding electrode that forms a weld bead having a reduced hydrogen content.

SUMMARY OF THE INVENTION

The present invention pertains to welding electrodes, and more particularly, to a welding electrode that includes a fill composition having reduced moisture pick-up and which facilitates in reducing the amount of hydrogen in the weld bead. The fill composition of the present invention is particularly directed to cored electrodes having a metal sheath which surrounds the fill composition in the core of the sheath; however, the fill composition can be applied to other types of electrodes (e.g., coating on a stick electrodes, etc.), or be used as part of a fill composition in a submerged arc welding process. The fill composition of the present invention is particularly formulated for use with electrodes used to weld mild and low alloy steel; however, the fill composition can be used with electrodes for the formation of welding beads on other types of metals. The metal electrode is typically formed primarily from iron (e.g., carbon steel, low carbon steel, stainless steel, low alloy steel, etc.); however, the base metal can be primarily formed of other materials. The fill composition typically constitutes at least about 1 weight percent of the total electrode weight, and not more than about 80 weight percent of the total electrode weight, and typically about 8-60 weight percent of the total electrode weight, and more typically about 10-40 weight percent of the total electrode weight, even more typically about 11-30 weight percent of the total electrode weight, and still even more about 12-20 weight percent of the total electrode weight.

In one aspect of the present invention there is provided a titanium dioxide based flux system that is formulated for use in a flux cored electrode; however, it can be appreciated that the flux system can be used in other types of welding systems. The flux system of the present invention includes titanium dioxide, slag forming agents and a moisture resistant compound. The titanium dioxide content of the flux system, not including the titanium dioxide content in the moisture resistant compound is generally at least about 2 weight percent of the flux system, typically about 5-40 weight percent of the flux system, and more typically about 5-35 weight percent of the flux system; however, other weight percentages can be used. The one or more slag forming agents in the flux system are generally used to facilitate in the formation of the weld bead and/or to at least partially shield the formed weld bead from the atmosphere; however, the slag forming agents can have other or additional functions. Non-limiting examples of such slag forming agents include metal oxides (e.g., aluminum oxide, boron oxide, calcium oxide, chromium oxide, iron oxide, magnesium oxide, manganese oxide, niobium oxide, potassium oxide, sodium oxide, tin oxide, vanadium oxide, zirconium oxide, etc.), metal carbonates (e.g., calcium carbonate, etc.), and/or metal fluorides (e.g., barium fluoride, bismuth fluoride, calcium fluoride, potassium fluoride, sodium fluoride, Teflon, etc.). The slag forming content of the flux system is typically at least about 5 weight percent of the flux system, typically about 10-60 weight percent of the flux system, and more typically about 20-45 weight percent of the flux system; however, other weight percentages can be used. The moisture resistant compound is a unique combination of at least four compounds, namely titanium dioxide, potassium compound, colloidal silica, and sodium compound. The moisture resistant compound is significantly less hygroscopic than flux systems that include silicate compounds (e.g., potassium silicate, sodium silicate, etc.). The potassium and sodium compounds of the moisture resistant compound function as binders for the moisture resistant compound and/or provide arc stability to the arc during a welding process. The moisture resistant compound content of the flux system is generally at least about 1 weight percent of the flux system, typically about 2-40 weight percent of the flux system, and more typically about 2-35 weight percent of the flux system; however, other weight percentages can be used.

In another aspect of the present invention, the moisture resistant compound is formulated to include a majority weight percent titanium dioxide. and a certain weight percent ratio of potassium oxide to sodium oxide. The titanium dioxide content of the moisture resistant compound is at least about 60 weight percent, typically about 75-92 weight percent, and more typically about 80-88 weight percent; however, other weight percentages can be used. The weight percent of the sodium compound in the moisture resistant compound is generally greater than the weight percent of the potassium compound; however, this is not required. The weight percent ratio of sodium compound content to potassium compound content of the moisture resistant compound is about 1.1-5:1, typically about 1.5-3.5:1, and more typically about 2-3:1; however, other weight percent rations can be used. The sodium compound is typically sodium dioxide, sodium carbonate, and/or sodium silicate; however, other or additional sodium compounds can be used. The potassium compound is typically potassium oxide and/or potassium silicate; however, other or additional potassium compounds can be used. The sodium compound content of the moisture resistant compound is at least about 3 weight percent of the moisture resistant compound, typically about 5-15 weight percent of the moisture resistant compound, and more typically about 7-12 weight percent of the moisture resistant compound; however, other weight percentages can be used. The moisture resistant compound can include additional components such as, but not limited to, lithium compounds (e.g., lithium hydroxide, lithium oxide, etc.), carbon, sulfur, etc. The colloidal silica content of the moisture resistant compound is typically at least about 1 weight percent, typically about 2-10 weight percent, and more typically about 2-8 weight percent; however, other weight percentages can be used. The average particle size of the colloidal silica is less than about 40 nm, typically about 0.5-20 nm, and more typically about 4-15 nm; however, other sizes can be used. The source of silica can be natural and/or artificial.

In still another aspect of the present invention, the moisture resistant compound is typically formed by combining a solution of colloidal silica with the other components of the moisture resistant compound. The solution generally includes about 10-70 weight percent colloidal silica, typically about 15-50 weight percent colloidal silica, and more typically about 25-40 weight percent colloidal silica; however, other weight percentages can be used. The water content of the solution is generally at least about 10 weight percent, typically about 30-80 weight percent, and more typically about 60-75 weight percent; however, other weight percentages can be used. The solution can also include other components such as, but not limited to, sodium compound. When sodium compound is included in the solution, the sodium compound generally is sodium oxide; however, other or additional sodium compounds can be used. The sodium compound content in the solution, when included, is generally about 0.05-1.5 weight percent; however, other weight percentages can be used. The pH of the solution is typically basic; however, this is not required.

In still another aspect of the present invention, the moisture resistant compound is processed such that the average particle size of the moisture resistant compound is less than about 30 mesh, typically between about 40-250 mesh, and more typically about 50-200 mesh. The moisture resistant compound is typically ground to the desired particle size.

In yet another aspect of the present invention, the fill composition includes one or more metal alloying agents, and/or one or more deoxidizers. The one or more metal alloying agents are generally included in the fill composition to at least closely match the desired weld metal composition and/or to obtain the desired properties of the formed weld bead. Non-limiting examples of such alloying metals include aluminum, boron, calcium, carbon, chromium, iron, manganese, nickel, silicon, titanium and/or zirconium.

In still yet another aspect of the present invention, the flux coded electrode generally includes a metal sheath. The metal sheath generally includes a majority of iron when welding a ferrous based workpiece (e.g., carbon steel, stainless steel, etc.); however, the composition of the sheath can include various types of metals to achieve a particular weld bead composition. In one embodiment of the invention, the metal sheath primarily includes iron and can include one or more other elements such as, but not limited to, aluminum, antimony, bismuth, boron, carbon, cobalt, copper, lead, manganese, molybdenum, nickel, niobium, silicon, sulfur, tin, titanium, tungsten, vanadium, zinc and/or zirconium. In still another and/or alternative embodiment of the invention, the iron content of the metal sheath is at least about 80 weight percent.

In a further and/or alternative aspect of the present invention, a shielding gas is used in conjunction with the flux cored electrode to provide protection to the weld bead from elements and/or compounds in the atmosphere. The shielding gas generally includes one or more gases. These one or more gases are generally inert or substantially inert with respect to the composition of the weld bead. In one embodiment, argon, carbon dioxide or mixtures thereof are at least partially used as a shielding gas. In one aspect of this embodiment, the shielding gas includes about 2-40 percent by volume carbon dioxide and the balance of argon. In another and/or alternative aspect of this embodiment, the shielding gas includes about 5-25 percent by volume carbon dioxide and the balance of argon. As can be appreciated, other and/or additional inert or substantially inert gases can be used.

It is a primary object of the invention to provide a welding electrode that reduces moisture pick-up properties.

Another and/or alternative object of the present invention is the provision of a welding electrode and welding process that results in a reduction of the amount of diffusible hydrogen in the weld bead.

Still another and/or alternative object of the present invention is the provision of a welding process that includes the use of a gas shielded cored electrode.

Yet another and/or alternative object of the present invention is the provision of a welding electrode that includes sodium-silico-titanate compound in a flux system to reduce moisture pick-up of the flux system.

These and other objects and advantages will become apparent from the discussion of the distinction between the invention and the prior art and when considering the preferred embodiment.

BRIEF DESCRIPTION OF TH INVENTION

The cored electrode of the present invention overcomes the past limitations of prior art cored electrodes by including a sodium-silico-titanate compound that reduces the moisture pick-up of the flux system of the cored electrode.

A general formulation of the fill composition (weight percent) in accordance with the present invention is set forth as follows:

| | |
|---|---|
| $TiO_2$ | 2-50% |
| Sodium-silico-titanate compound | 1-55% |
| Slag forming Agent | 1-60% |
| Metal Alloying Agent | 0-70% |

In another more specific general formulation of the fill composition (weight percent):

| | |
|---|---|
| $TiO_2$ | 3-40% |
| Sodium-silico-titanate compound | 1-55% |
| Slag forming Agent | 20-50% |
| Metal Alloying Agent | 0-55% |

In another more specific general formulation of the fill composition (weight percent):

| | |
|---|---|
| $TiO_2$ | 20-40% |
| Sodium-silico-titanate compound | 20-50% |
| Slag forming Agent | 25-45% |
| Metal Alloying Agent | 0-35% |

In still another more specific general formulation of the fill composition (weight percent):

| | |
|---|---|
| $TiO_2$ | 3-15% |
| Sodium-silico-titanate compound | 15-25% |
| Slag forming Agent | 30-40% |
| Metal Alloying Agent | 35-45% |

In yet another more specific general formulation of the fill composition (weight percent):

| | |
|---|---|
| $TiO_2$ | 20-30% |
| Sodium-silico-titanate compound | 1-5% |
| Slag forming Agent | 20-30% |
| Metal Alloying Agent | 45-55% |

In the above examples, the weight percent of the fill composition is typically about 8-60 weight percent of the cored electrode, and more typically about 10-28 weight percent of the cored electrode; however, other weight percentages can be used. The metal sheath that can be used to form the weld bead can include about 0-0.2 weight percent B, about 0-0.2 weight percent C, about 0-12 weight percent Cr, about 0-5 weight percent Mn, about 0-2 weight percent Mo, less than about 0.01% N, about 0-5 weight percent Ni, less than about 0.014% P, about 0-4 weight percent Si, less than about 0.02% S, about 0-0.4 weight percent Ti, about 0-0.4 weight percent V and about 75-99.9 weight percent Fe. During an arc welding process, a shielding gas is typically used with the cored electrode; however, this is not required. When a shielding gas is used, the shielding gas is typically a carbon dioxide and argon blend.

The slag forming agent typically includes, but is not limited to, metal oxides such as aluminum oxide, boron oxide, calcium oxide, chromium oxide, iron oxide, magnesium oxide, niobium oxide, potassium oxide, silicon dioxide, sodium oxide, tin oxide, vanadium oxide and/or zirconium oxide. The metal alloying agent, when used, typically includes, but is not limited to, aluminum, boron, calcium, carbon, iron, manganese, nickel, silicon, titanium and/or zirconium. The flux system can include other compounds such as, but not limited to, metal carbonates (e.g., calcium carbonate, etc.) and/or metal fluorides (e.g., barium fluoride, bismuth fluoride, calcium fluoride, potassium fluoride, sodium fluoride, Teflon, etc.). The particular components of the flux system typically depend on the type of welding process (SAW, SMAW, FCAW) to be used and/or the type of workpiece to be welded.

The sodium-silico-titanate compound is specifically formulated to provide arc stability and to reduce moisture pick-up of the flux system. The sodium-silico-titanate compound typically includes titanium dioxide, potassium silicate, sodium silicate and colloidal silica. The titanium dioxide content of the sodium-silico-titanate compound typically is a majority weight percent. The weight percent ratio of the sodium silicate to potassium silicate is generally about 1.5-3.5:1, and more typically about 1.75-2.5:1. Typically, a majority of the silicon dioxide that forms the colloidal silica is from a pure source. Typically, the particles of silica have an average particle size of about 2-25 nanometers, and more typically, an average particle size of about 6-12 nanometers. The sodium-silico-titanate compound can include other sodium compounds such as, but not limited to sodium carbonate. These sodium compounds can be used to provide arc stability and/or gas shielding during the welding process. The sodium-silico-titanate compound can also include other components such as water, lithium compounds, sulfur, carbon, etc.; however, this is not required. These other components, when included in the sodium-silico-titanate compound typically constitute less than about 10 weight percent of the sodium-silico-titanate compound.

The sodium-silico-titanate compound is typically formed by mixing the solution of colloidal silica with the titanium oxide (e.g., rutile), the silicates, and any other components of sodium-silico-titanate compound. After the components of the sodium-silico-titanate compound have been properly mixed together, the sodium-silico-titanate compound is dried to remove the water from the sodium-silico-titanate compound. After the sodium-silico-titanate compound has been dried, the water content of the sodium-silico-titanate compound is generally less than about 0.1 weight percent, typically less than about 0.08 weight percent, and more typically, less than about 0.06 weight percent. After the sodium-silico-titanate compound has been dried, the sodium-silico-titanate compound is typically sized. This sizing process is typically performed by a grinding and screening operation; however, other or additional sizing processes can be used. The average particle size of the sodium-silico-titanate compound after sizing is typically less than 40 mesh and more typically about 50-200 mesh.

Examples of the sodium-silico-titanate compound are set forth below (weight percent of sodium-silico-titanate compound):

Example 1

| | |
|---|---|
| $TiO_2$ | 60-90% |
| Sodium silicate | 1-20% |
| Potassium silicate | 1-15% |
| Sodium compound | 1-20% |
| Colloidal Silica | 1-10% |
| Other components | 0-5% |

Example 2

| | |
|---|---|
| $TiO_2$ | 70-90% |
| Sodium silicate | 4-15% |
| Potassium silicate | 1-10% |
| Sodium carbonate | 3-16% |
| Colloidal Silica | 2-6% |
| Other components | 0-1% |

Example 3

| | |
|---|---|
| $TiO_2$ | 70-80% |
| Sodium silicate | 3.5-10% |
| Potassium silicate | 1.5-6% |
| Sodium carbonate | 5-15% |
| Colloidal Silica | 2-5% |
| Other components | 0-0.5% |

These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

I claim:

1. A cored electrode having reduce moisture pick-up properties and which forms a weld bead with low diffusible hydrogen in mild and low alloy steel comprising a metal sheath and a fill composition, wherein said fill composition is about 6-80 weight percent of said cored electrode, said fill composition including titanium dioxide, a slag forming agent and a moisture resistant compound, said moisture resistant compound comprising a sodium-silico-titanate compound, wherein said sodium-silico-titanate compound is formed of a combination of a titanium compound, a potassium compound, a sodium compound and colloidal silica, said moisture resistant compound having an average particle size of 30-250 mesh, said moisture resistant compound including over 50 weight percent titanium compound, said moisture resistant compound having a weight ratio of sodium compound to potassium compound of about a 1.1-5:1, and said moisture resistant compound including at least about 1 weight percent colloidal silica, said colloidal silica having an average particle size of less than about 40 nm.

2. The cored electrode as defined in claim 1, wherein said slag forming agent constitutes about 10-50 weight percent of said fill composition.

3. The cored electrode as defined in claim 1, where said slag forming agent includes a metal oxide.

4. The cored electrode as defined in claim 3, wherein a majority of said slag forming agent includes said metal oxide.

5. The cored electrode as defined in claim 1, wherein said moisture resistant compound constitutes about 1-40 weight percent of said fill composition.

6. The cored electrode as defined in claim 4, wherein said moisture resistant compound constitutes about 1-40 weight percent of said fill composition.

7. The cored electrode as defined in claim 1, wherein said moisture resistant compound weight ratio of sodium compound to potassium compound is about 1.5-3.5:1, said colloidal silica constituting about 2-10 weight percent of said moisture resistant compound.

8. The cored electrode as defined in claim 6, wherein said moisture resistant compound weight ratio of sodium compound to potassium compound is about 1.5-3.5:1, said colloidal silica constituting about 2-10 weight percent of said moisture resistant compound.

9. The cored electrode as defined in claim 1, including a metal alloying agent, said metal alloying agent including aluminum, magnesium, silicon, titanium, and mixtures thereof.

10. The cored electrode as defined in claim 8, including a metal alloying agent, said metal alloying agent including aluminum, magnesium, silicon, titanium, and mixtures thereof.

11. The cored electrode as defined in claim 1, wherein said fill composition includes:

| | |
|---|---|
| $TiO_2$ | 5-50% |
| Sodium-silico-titanate compound | 2-50% |
| Slag forming Agent | 1-60% |
| Metal Alloying Agent | 0-70% |

12. The cored electrode as defined in claim 10, wherein said fill composition includes:

| | |
|---|---|
| TiO₂ | 5-50% |
| Sodium-silico-titanate compound | 2-50% |
| Slag forming Agent | 1-60% |
| Metal Alloying Agent | 0-70% |

13. The cored electrode as defined in claim 1, wherein said fill composition includes:

| | |
|---|---|
| TiO₂ | 3-40% |
| Sodium-silico-titanate compound | 1-55% |
| Slag forming Agent | 20-50% |
| Metal Alloying Agent | 0-55% |

14. The cored electrode as defined in claim 12, wherein said fill composition includes:

| | |
|---|---|
| TiO₂ | 3-40% |
| Sodium-silico-titanate compound | 1-55% |
| Slag forming Agent | 20-50% |
| Metal Alloying Agent | 0-55% |

15. The cored electrode as defined in claim 1, wherein said moisture resistant compound having reduced moisture pick-up such that the moisture pick of said moisture resistant compound over a 96 hour period at 80° F. and 80% relative humidity is less than about 0.2% for particles having an average particle size of 40-200 mesh.

16. The cored electrode as defined in claim 14, wherein said moisture resistant compound having reduced moisture pick-up such that the moisture pick of said moisture resistant compound over a 96 hour period at 80° F. and 80% relative humidity is less than about 0.2% for particles having an average particle size of 40-200 mesh.

17. The cored electrode as defined in claim 1, wherein said moisture resistant compound includes by weight percent:

| | |
|---|---|
| TiO₂ | 60-90% |
| Sodium silicate | 1-20% |
| Potassium silicate | 1-15% |
| Sodium compound | 1-20% |
| Colloidal Silica | 1-10% |
| Other components | 0-5% |

18. The cored electrode as defined in claim 16, wherein said moisture resistant compound includes by weight percent:

| | |
|---|---|
| TiO₂ | 60-90% |
| Sodium silicate | 1-20% |
| Potassium silicate | 1-15% |
| Sodium compound | 1-20% |
| Colloidal Silica | 1-10% |
| Other components | 0-5% |

19. The cored electrode as defined in claim 17, wherein said moisture resistant compound includes by weight percent:

| | |
|---|---|
| TiO₂ | 70-90% |
| Sodium silicate | 4-15% |
| Potassium silicate | 1-10% |
| Sodium carbonate | 3-16% |
| Colloidal Silica | 2-6% |
| Other components | 0-1% |

20. The cored electrode as defined in claim 18, wherein said moisture resistant compound includes by weight percent:

| | |
|---|---|
| TiO₂ | 70-90% |
| Sodium silicate | 4-15% |
| Potassium silicate | 1-10% |
| Sodium carbonate | 3-16% |
| Colloidal Silica | 2-6% |
| Other components | 0-1% |

21. The cored electrode as defined in claim 1, wherein said moisture resistant compound having a water content after being dried of less than about 0.08 weight percent.

22. The cored electrode as defined in claim 20, wherein said moisture resistant compound having a water content after being dried of less than about 0.08 weight percent.

23. The cored electrode as defined in claim 1, wherein said moisture resistant compound having an average particle size of about 40-200 mesh.

24. The cored electrode as defined in claim 22, wherein said moisture resistant compound having an average particle size of about 40-200 mesh.

25. A cored electrode having reduce moisture pick-up properties and which forms a weld bead with low diffusible hydrogen in mild and low alloy steel comprising a metal sheath and a fill composition, wherein said fill composition is about 6-80 weight percent of said cored electrode, said fill composition including titanium dioxide, wherein said titanium dioxide constitutes about 5-40 weight percent of said fill composition, a slag forming agent, said slag forming agent constituting about 10-60 weight percent of said fill composition, and a moisture resistant compound, said moisture resistant compound comprising a sodium-silico-titanate compound, wherein said sodium-silico-titanate compound is formed of a combination of a titanium compound, a potassium compound, a sodium compound and colloidal silica, said moisture resistant compound having an average particle size of 30 mesh to 250 mesh, said moisture resistant compound including over 50 weight percent titanium compound, about a 1.1-5:1 weight percent ratio of sodium compound to potassium compound, and at least about 1 weight percent colloidal silica, said colloidal silica having an average particle size of less than about 40 nm.

26. The cored electrode as defined in claim 25, includes a metal alloying agent, said metal alloying agent including aluminum, magnesium, silicon, titanium, and mixtures thereof.

27. The cored electrode as defined in claim 25, wherein said fill composition includes in weight percent:

| | |
|---|---|
| TiO₂ | 5-35% |
| Moisture resistant compound | 2-35% |
| Slag forming Agent | 20-45% |
| Metal Alloying Agent | 0-70% |

28. The cored electrode as defined in claim 26, wherein said fill composition includes in weight percent:

| | |
|---|---|
| TiO$_2$ | 5-35% |
| Moisture resistant compound | 2-35% |
| Slag forming Agent | 20-45% |
| Metal Alloying Agent | 0-70% |

29. The cored electrode as defined in claim 25, wherein said moisture resistant compound having reduced moisture pick-up such that the moisture pick of said moisture resistant compound over a 96 hour period at 80° F. and 80% relative humidity is less than about 0.2% for particles having an average particle size of 40-200 mesh.

30. The cored electrode as defined in claim 28, wherein said moisture resistant compound having reduced moisture pick-up such that the moisture pick of said moisture resistant compound over a 96 hour period at 80° F. and 80% relative humidity is less than about 0.2% for particles having an average particle size of 40-200 mesh.

31. The cored electrode as defined in claim 25, wherein said moisture resistant compound includes by weight percent:

| | |
|---|---|
| TiO$_2$ | 60-90% |
| Sodium silicate | 1-20% |
| Potassium silicate | 1-15% |
| Sodium compound | 1-20% |
| Colloidal Silica | 1-10% |
| Other components | 0-5% |

32. The cored electrode as defined in claim 30, wherein said moisture resistant compound includes by weight percent:

| | |
|---|---|
| TiO$_2$ | 60-90% |
| Sodium silicate | 1-20% |
| Potassium silicate | 1-15% |
| Sodium compound | 1-20% |
| Colloidal Silica | 1-10% |
| Other components | 0-5% |

33. The cored electrode as defined in claim 25, wherein said moisture resistant compound includes by weight percent:

| | |
|---|---|
| TiO$_2$ | 70-90% |
| Sodium silicate | 4-15% |
| Potassium silicate | 1-10% |
| Sodium compound | 3-16% |
| Colloidal Silica | 2-6% |
| Other components | 0-1% |

34. The cored electrode as defined in claim 32, wherein said moisture resistant compound includes by weight percent:

| | |
|---|---|
| TiO$_2$ | 70-90% |
| Sodium silicate | 4-15% |
| Potassium silicate | 1-10% |
| Sodium compound | 3-16% |
| Colloidal Silica | 2-6% |
| Other components | 0-1% |

35. The cored electrode as defined in claim 25, wherein said moisture resistant compound having a water content after being dried of less than about 0.08 weight percent.

36. The cored electrode as defined in claim 34, wherein said moisture resistant compound having a water content after being dried of less than about 0.08 weight percent.

\* \* \* \* \*

UNITED STATES PATENT AND TRADEMARK OFFICE
CERTIFICATE OF CORRECTION

PATENT NO. : 8,629,374 B2
APPLICATION NO. : 11/099267
DATED : January 14, 2014
INVENTOR(S) : Katiyar Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2080 days.

Signed and Sealed this
Fifth Day of May, 2015

Michelle K. Lee
*Director of the United States Patent and Trademark Office*